Nov. 22, 1938.　　　N. E. DORRINGTON　　　2,137,334
METHOD OF AND APPARATUS FOR WEIGHING OUT CHARGES
Filed Jan. 18, 1934　　　9 Sheets-Sheet 2

Patented Nov. 22, 1938

2,137,334

UNITED STATES PATENT OFFICE 2,137,334

METHOD OF AND APPARATUS FOR WEIGHING OUT CHARGES

Neill E. Dorrington, Oswego, N. Y., assignor to St. Regis Paper Company, New York, N. Y., a corporation of New York Application January 18, 1934, Serial No. 707,087

17 Claims. (Cl. 249—15)

This invention relates to a weighing device and more particularly to an automatic weighing apparatus in which the main charge is fed into a weighing can or bucket rapidly and the charge is completed by a dribble feed.

An object of the invention is to provide a method by which a continuous, substantially uniform stream of material may be divided into successive weighed charges, while weighing out the charges by introducing the major portion of a charge into a weighing receptacle rapidly and completing the charge by a relatively slow dribble feed.

A further object is to provide apparatus by which this method can be carried out.

Another object of the invention is to produce a weighing device of the character described in which the major movements are produced by mechanical power from any desired source while these movements are controlled by the operation of the weighing beam with the least practicable interference with the free weighing motion.

Another object of the invention is to provide apparatus whereby the gates and deflectors necessary for the weighing operation are controlled and operated in proper sequence, mainly by mechanical timing means, the operation of which is instituted by tripping mechanism.

Further objects of the invention will appear as the description proceeds.

The apparatus in general comprises a supporting device, a device for receiving and controlling the main feeding stream and dividing it into main charges and additional dribble feed charges, a weighing device determining the exact weight of each charge and controlling mechanism tripped by the weighing device but having mechanical power received from another source for operating and controlling the sequence of movements of the gates, deflectors, etc. Details will appear in the following full description.

In the drawings forming a part of this specification one form of apparatus embodying the invention is shown in considerable detail.

The mechanism shown is supported by a bracket 20 which has a flattened portion 21 suitable for bolting to any supporting structure. A hopper 22 for directing and controlling a feeding stream is attached at 23 to a forward projection on bracket 20. From the sides of bracket 20 there are projections 24 and 25 on which are pivoted scale beams 26 and 27 from the forward ends of which is hung a weighing can 28 and from the rear ends of which is hung a main weight 29. Beneath bracket 20 there is attached at 30 a housing 31 for tripping and timing control mechanism.

The directing and controlling feed hopper 22 has two downwardly extending boots 32, 33 terminating in openings 34 and 35 which are shown in the drawings as being closed by arcuate gates. The gate 36 which closes opening 34 is pivoted to the hopper at 37 while the gate 38, which closes opening 35, is pivoted to the hopper at 39. An arm 40 extending upward and forward from pivot 37 and attached to gate 36 is connected by a link 41 to arm 42 extending forward from pivot 39 and attached to gate 38. An arm 43 extending upward and to the rear from pivot 39 and attached to gate 38 has pivoted to the end thereof a connecting member 44 which is adjustably attached to a rod 45 which connects it to a connecting member 46. Connecting member 46 is pivoted to a control arm 47 which is actuated in a manner to be described later.

Hopper 22 is provided with an opening 50 between boots 32 and 33. A wall 51 extends upward from the rear side of opening 50 and partially forward over the opening, while a wall 52 extends upward and to the rear from the front side of opening 50. Between the upper ends of walls 51 and 52 there is an inlet opening 53. A V-shaped deflector 54 is mounted to swing into and out of space 53. The deflector is mounted on an arm 55 pivoted at 56 and an arm 57 pivoted at 58. These pivots are mounted in brackets 59 extending upward from the sides of hopper 22. From arm 57 there projects a screw threaded bolt 60 on which there is mounted adjustably a weight 61 which normally urges deflector 54 towards opening 53.

There also projects from arm 57 an arm 62 connected by a link 63 with an arm 64 pivoted at 65 and operated as will be described later.

Figures 1, 14:
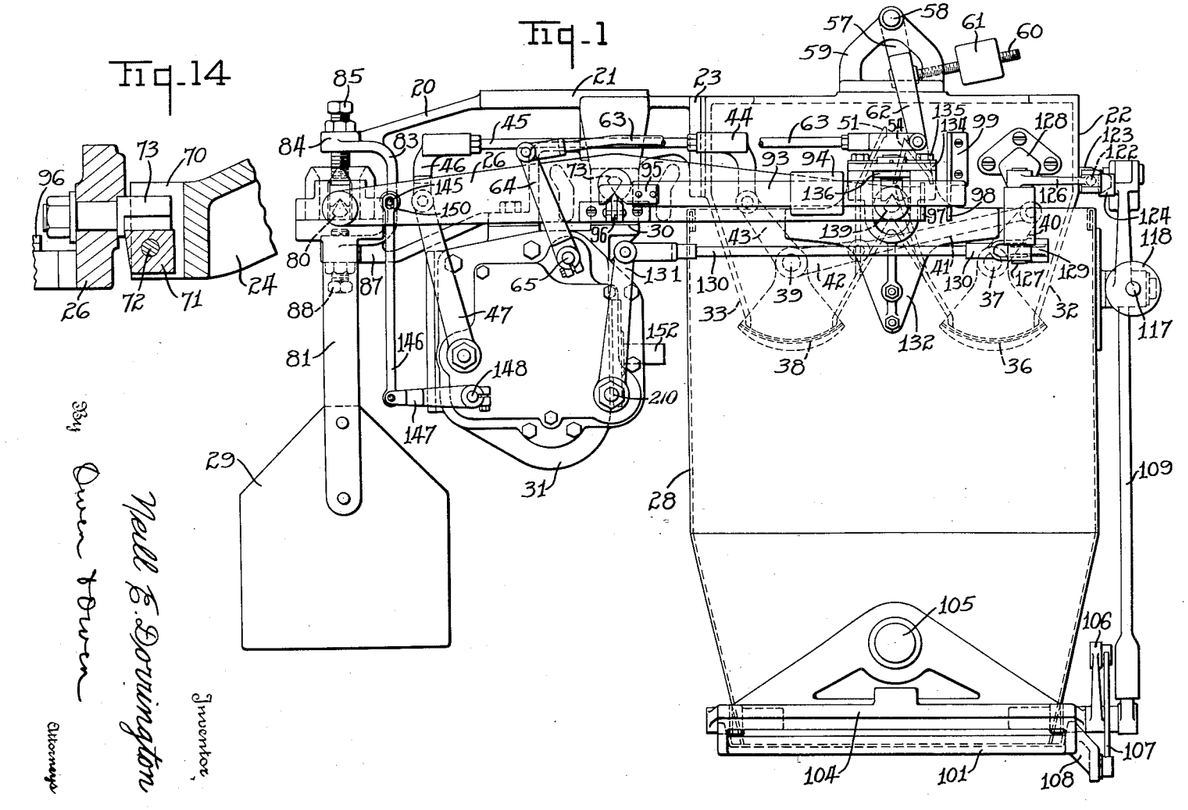
Figure 1 is a side elevation of the apparatus.
Figure 14 is a detail section showing the mounting of the scale beam upon the main supporting bracket. In a number of these figures certain parts are omitted for clarity of illustration.

At the end of arm 24 there is a fork 70 (see Fig. 14) in which there is mounted a bearing block 71 which is adjustable upon a pin 72 extending crosswise of the fork. A knife edge bearing 73 is pivoted upon bearing block 71 and is attached to and supports scale beam 26. On arm 25 there is a similar fork 74 which in like manner supports knife edge bearing 75 of scale beam 27.

A cross bar 76 extends between the rear ends of the scale beams. At each end of cross bar 76 there is a mounting 77 for a bearing block 78 which is adjustably mounted upon a pin 79 in the end 77 and rests upon a knife edge bearing 80 extending from the end of the scale beam. Hangers 81 extend downward from cross bar 76 and support main weight 29. The main weight may comprise a metal container or basket in which there is placed a plurality of blocks, the number of which may be varied for rough adjustment of the weight.

A rear extension 83 of the bracket 20 has an upper arm 84 in which there is mounted a set screw 85 adapted to contact a central member 86 in cross arm 76 and limit the upward movement of the cross arm. Extension 83 likewise has a lower arm 87 in which there is mounted an adjustable screw 88 which limits the downward movement of arm 76 and weight 29.

Projections 90 from the side of scale beam 27 carry a bar 91 on which there is slidable the relatively small counterpoise weight 92 by which fine adjustment of weight may be made.

Figure 2:
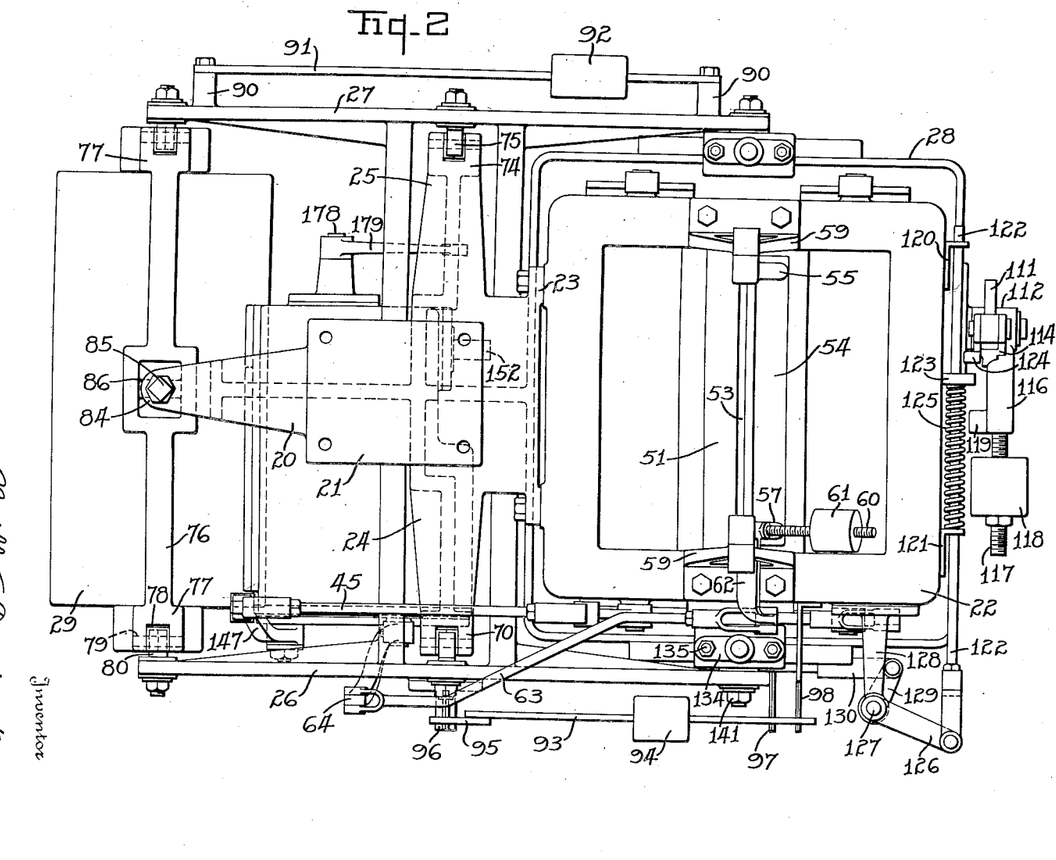
Figure 2 is a plan view of the apparatus shown in Figure 1.

A bar 93 having thereon an adjustable weight 94 has one end 95 resting upon a knife edge bearing 96 extending outward from scale beam 26 and in line with knife edge bearing 73. (See Figs. 1, 2, and 14.) The other end of bar 93 normally rests upon a lug 97 extending outward from scale beam 26 when that can is in its upper position. When the can is lowered by the weight of material therein raising main weight 29, bar 93 encounters lug 98 extending from hopper 22. Weight 94 thus acts as a dribble feed weight, as will be more fully disclosed later.

Figure 3:
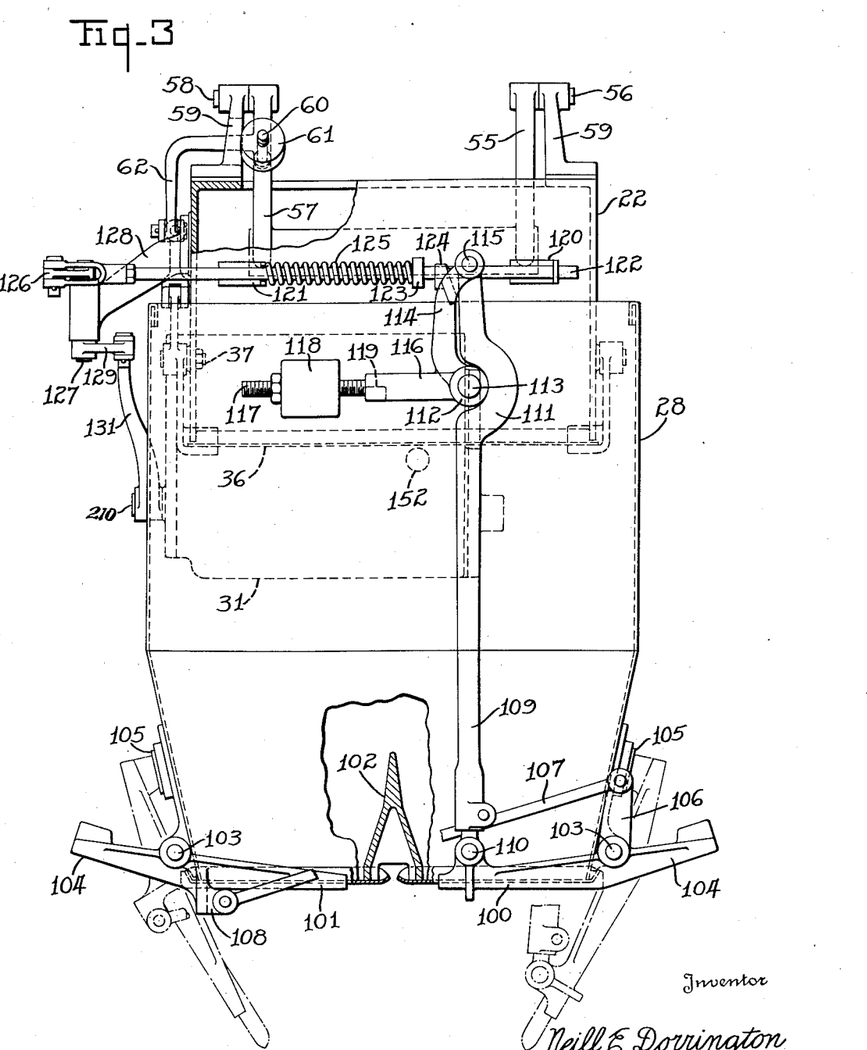
Figure 3 is an end elevation of the apparatus viewed from the right of Figures 1 and 2.

In the form disclosed the bottom end of the weighing can is closed by two gates 100 and 101 (see Fig. 3). These gates extend inward under a central cross piece 102 and are pivoted at 103 at the sides of the can. Each gate has an outward extension 104, the end of which is adapted to encounter a block 105 on the side of the can when the gate is fully open. A cushioning member may be provided at this point either upon the block or upon the extension if desired.

An arm 106 extends upward from gate 100 and is connected by a link 107 to a lug 108 beneath gate 101. By this link connection the gates are compelled to move in unison.

A vertical bar 109 is pivoted at 110 to gate 100. The upper end of bar 109 has an offset portion 111 normally fitting around a rock member 112 pivoted at 113. An arm 114 extends upward from this rock member and is connected by pivot 115 to the upper end of bar 109. An arm 116 extends horizontally from rock member 112, when the gates are in closed position, and has extending from the end thereof a threaded bolt 117 on which there is an adjustable weight 118. It will be seen that this weight tends to hold the parts in the position in which they are shown in Figure 3, and that pivots 115, 113 and 110 are in line, so that the weight of the gates and material thereon is borne by pivot 113. Arm 116 has thereon a lug 119 for purposes which will be described later.

From the side of hopper 22 there extend guide brackets 120 and 121 in which there is guided a rod 122 which has thereon an abutment member 123 adapted to contact a lug 124 on the upper end of arm 114. Between block 123 and guide 121 there is a normally compressed spring 125. The outer end of rod 122 is connected to an arm 126 on a rock shaft 127 mounted in an arm 128 extending from hopper 22. (See Fig. 2.) Another arm 129 extending from the lower end of rock shaft 127 has pivoted thereto a rod 130, the other end of which is pivoted to the upper end of an arm 131 which in turn is pivoted upon housing 31 and is operated in the manner which will be described hereafter.

Figures 11, 12, 13:
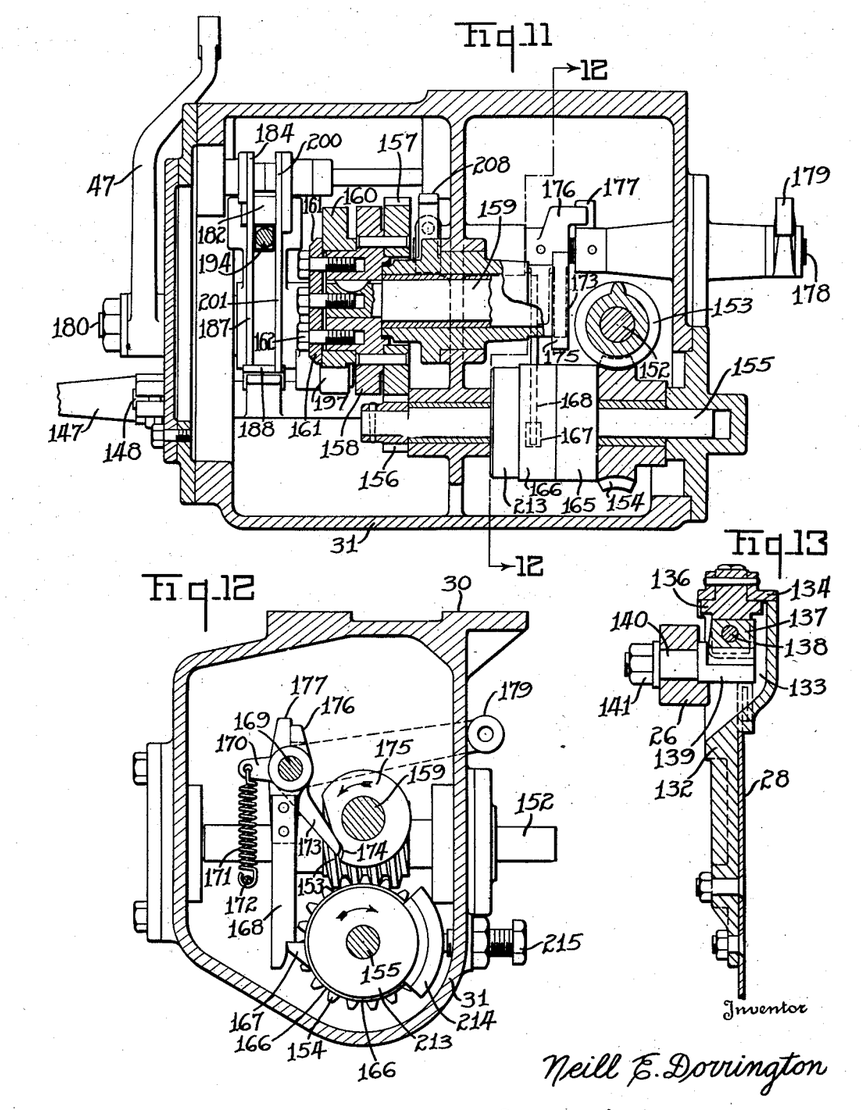
Figure 11 is a section somewhat similar to Figure 9 but taken on another plane.
Figure 12 is a section on the line 12—12 of Figure 11.
Figure 13 is a sectional detail showing the mounting of the weighing cam upon the scale beam.

In detail Figure 13 there is shown the manner in which weighing can 28 is supported from the scale beams. It will be understood that the construction is the same at each side of the can although only one of the supports is shown. A bracket 132 is attached to the upper part of the side of weighing can 28 and extends above the wall of the can and is formed thereabove with a recess 133. Over this recess there is a cover 134 fastened in place by bolts 135. (See Figure 2.) Underneath cover 134 there is a block 136 which rests on a pivot block 137 held adjustably in the recess by a pin 138. This bearing block 137 rests upon a knife edge pivot 139 on the end of a stud 140 held in beam 26 by a nut 141. It will be understood that the other pivotal connections with the scale beam, being described in detail, are similar to that shown in Figure 13.

Figure 5:
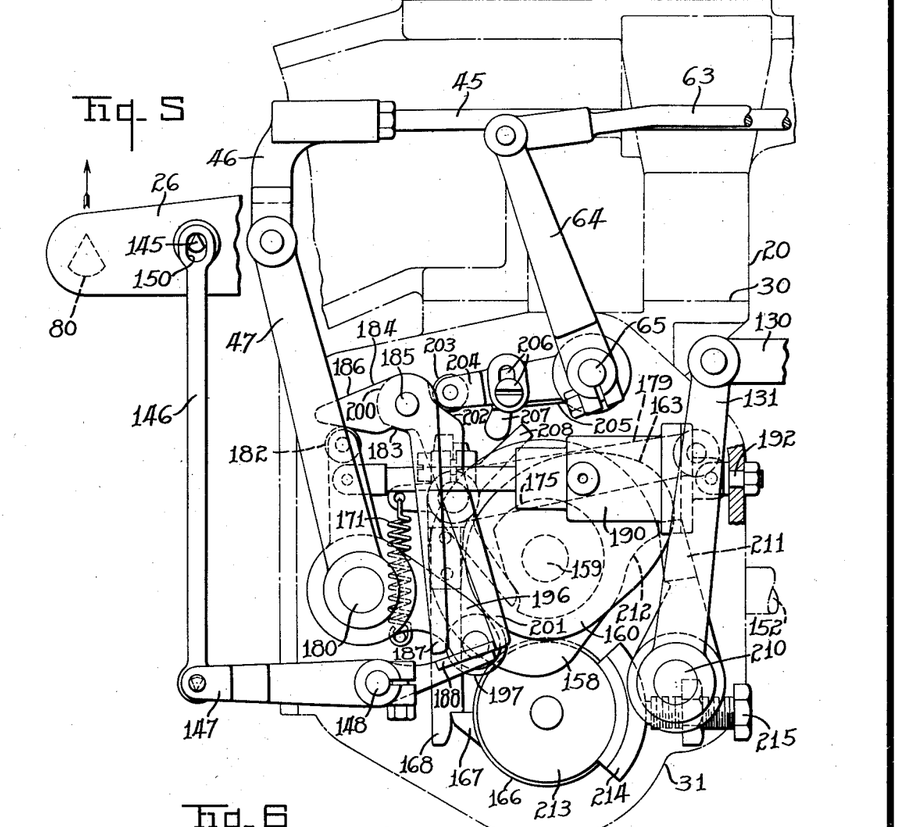
Figure 5 is an enlarged side elevation of the tripping, timing and control mechanism, parts being removed for a clearer view of the operating mechanism.
Figure 6:
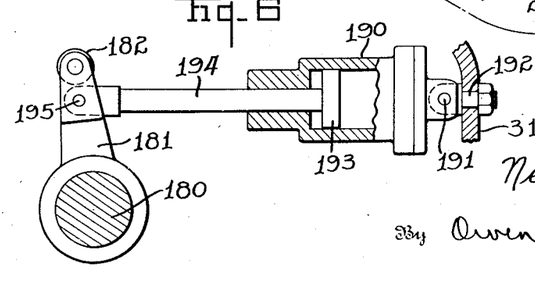
Figure 6 is a detail section of a dash pot arrangement shown in Figure 5.

To the rear of scale beam 26 there is connected a tripping device, as most clearly appears from Figure 5. A knife edge pivot support 145 extends outward from the side of the beam and there rests thereon a link 146, the lower end of which is pivoted by a knife edge connection to an arm 147 on a rock shaft 148 mounted in housing 31. The upper end of link 146 is formed with an elongated slot 150 receiving pivotal support 145 and allowing for lost motion, for purposes which will be described later.

The construction mounted in the control housing will be described next, particularly in connection with Figures 5 to 12 inclusive. A main shaft 152 is mounted across the housing and is driven by any suitable means, not shown. Main shaft 152 carries a worm 153 which meshes with a worm wheel 154 mounted loosely upon a shaft 155, but having a driving connection with the shaft through a clutch which will be described later. On the other end of shaft 155 there is mounted a gear 156 meshing with a larger gear 157, gear 157 being an even multiple of the size of gear 156, in the example shown gear 157 being four times as large as gear 156. Pinned to the side of gear 157 there is a cam 158 which is keyed onto a shaft 159. A cam 160 is held in place against cam 158 by means of a plate 161 clamped in place by bolts 162. Cam 160 is concentric for about one-half of its periphery and has a rise or lobe 163 extending around its other half. Cam 158 is concentric at 164 for about three-quarters of its periphery.

The clutch through which worm wheel 154 drives shaft 155 comprises driving member 165 attached to worm wheel 154 and driven member 166 attached to shaft 155. The opening and closing of the clutch is controlled by a clutch finger 167 in a well known manner, this clutch finger being normally urged by a spring, not shown, into clutch closing position but being forced into clutch opening position when it encounters a stop. In the drawings it is shown in open position, held in that position by a stop finger 168 mounted upon a rock shaft 169. (See Figure 12 in particular.) A lug 170 attached to the finger is connected by a tension spring 171 to a pin 172 mounted in housing 31 and normally urges stop finger 168 into clutch opening position. A finger 173 projecting at an angle from finger 168 rests in a recess 174 in cam 175 on shaft 159 when finger 168 is in clutch opening position. A lug 176 projects upwards from finger 168 and is in position to be contacted by a lug 177 projecting outward from a shaft 178 which may be operated by an arm 179 when desired. This is a manually operable tripping connection which may be used when desired, but is not used during the normal operation of the machine, as will be explained later.

Figure 7:
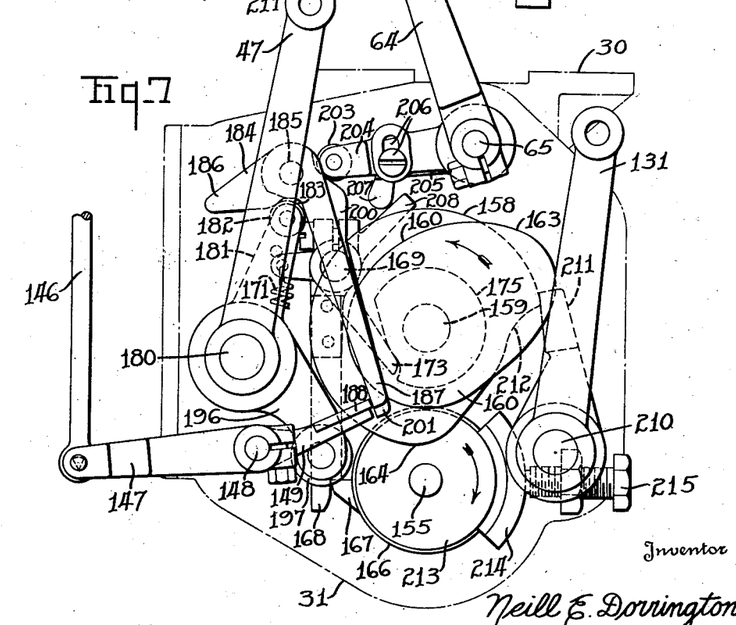
Figure 7 is a view somewhat similar to Figure 5 but showing certain of the parts in a different position.
Figure 8:
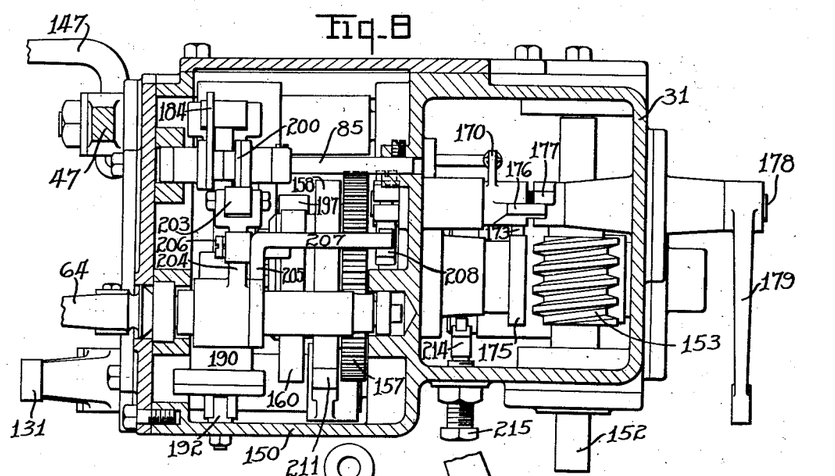
Figure 8 is a horizontal section of the timing and controlling device.
Figure 9:
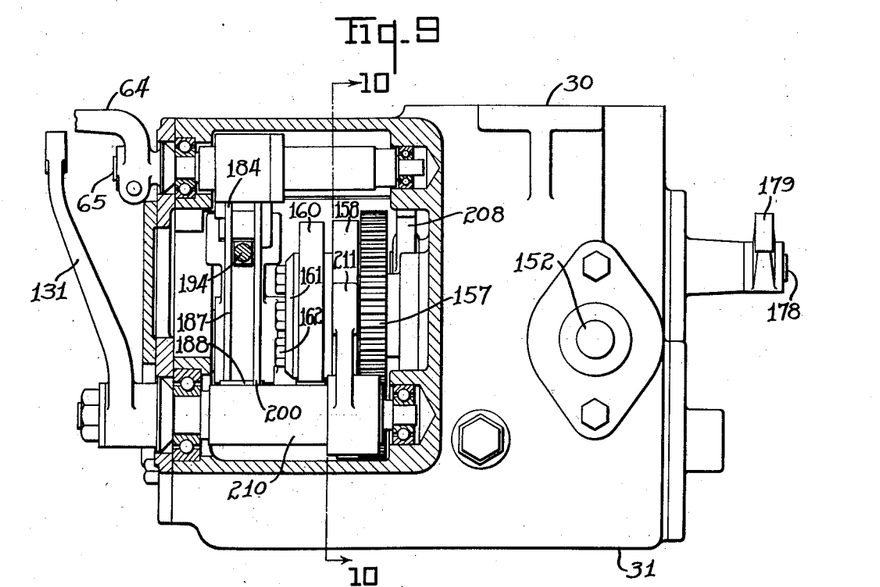
Figure 9 is a partial vertical section through a portion of the tripping, timing and controlling device.

The arm 47 which controls the position of gates 36 and 38 is mounted upon a rock shaft 180 journalled in the housing 31. An arm 181 extending upward from rock shaft 180 carries at its upper end a roller 182 normally held in a recess 183 in a latch member 184 pivoted at 185. The latch member has a rearwardly extending cam member 186 and a downwardly extending latch finger 187 held in place by a latch plate 188 on arm 149 in the position of the apparatus shown in Figure 7. When arm 47 is in the position in which it is shown in Figure 7 it will be seen that gates 36 and 38 are in open position. When scale beam 26 raises link 146 so as to move plate 188 below the end of latch finger 187, latch member 184 swings to the position in which it is shown in Figure 5 and allows the weight of the gates 36 and 38 to close them, swinging roller 182 backwards along cam 186 and forcing latch finger 187 to the position in which it is shown in Figure 5.

In order to prevent this motion from resulting in a sudden jar which might be transmitted to the weighing mechanism with injurious results, a cushioning arrangement is preferable. In the construction shown a dash pot connection is provided for this purpose. (See Figure 4 and detail Figure 6.) A cylinder 190 is pivoted at 191 to a pin 192 fastened to the housing 31. A piston 193 within the cylinder is connected by a rod 194 to a pivot 195 on arm 181. The piston and rod fit closely enough within the cylinder and the end of the cylinder so that air is compressed between the piston and the end of the cylinder by rapid movement of arm 181, and the closing movement of the gates is cushioned in this way.

Projecting downward and forward from rock shaft 180 there is an arm 196 bearing on its end a roller 197 contacting cam 160.

Arm 64, which controls the movement of V-shaped deflector gate 54, is mounted upon rock shaft 65 journalled in housing 31. Mounted on pivot pin 185 beside latch member 184 there is a latch member 200 having a downwardly extending finger 201 engaging plate 188 in the position in which the apparatus is shown in Figure 5. Latch 200 has near its upper end a socket 202 in which there normally rests a roller 203 on the end of an arm 204 projecting from rock shaft 65. Loosely mounted upon rock shaft 65 beside arm 204 there is an arm 205 connected by a pin and slot connection 206 for angular adjustment with respect to arm 204. On the end of arm 205 there is extended an operating lug 207, the end of which projects above a lug 208 rigid upon the pivot shaft 169 of trip finger 168.

Figure 10:
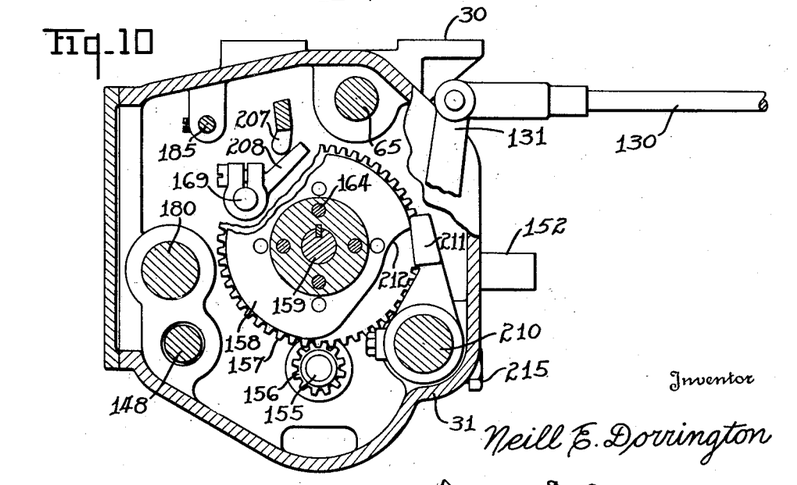
Figure 10 is a vertical section on the line 10—10 of Figure 9.

Arm 131 which controls dumping gates 100 and 101 is mounted on rock shaft 210 from the other end of which there projects upwards an arm 211 contacting cam 158 and in position to drop into a recess 212 in that cam as soon as it moves from the position in which it is shown in Figures 5, 7 and 10.

In order to prevent any danger of the overrunning of shaft 155 and the controlling cams when the clutch is opened by contact of clutch finger 167 with stop finger 168, there is provided on shaft 155 a brake drum 213 against which a shoe 214 may be pressed to the desired extent by a set screw 215.

Figure 4:
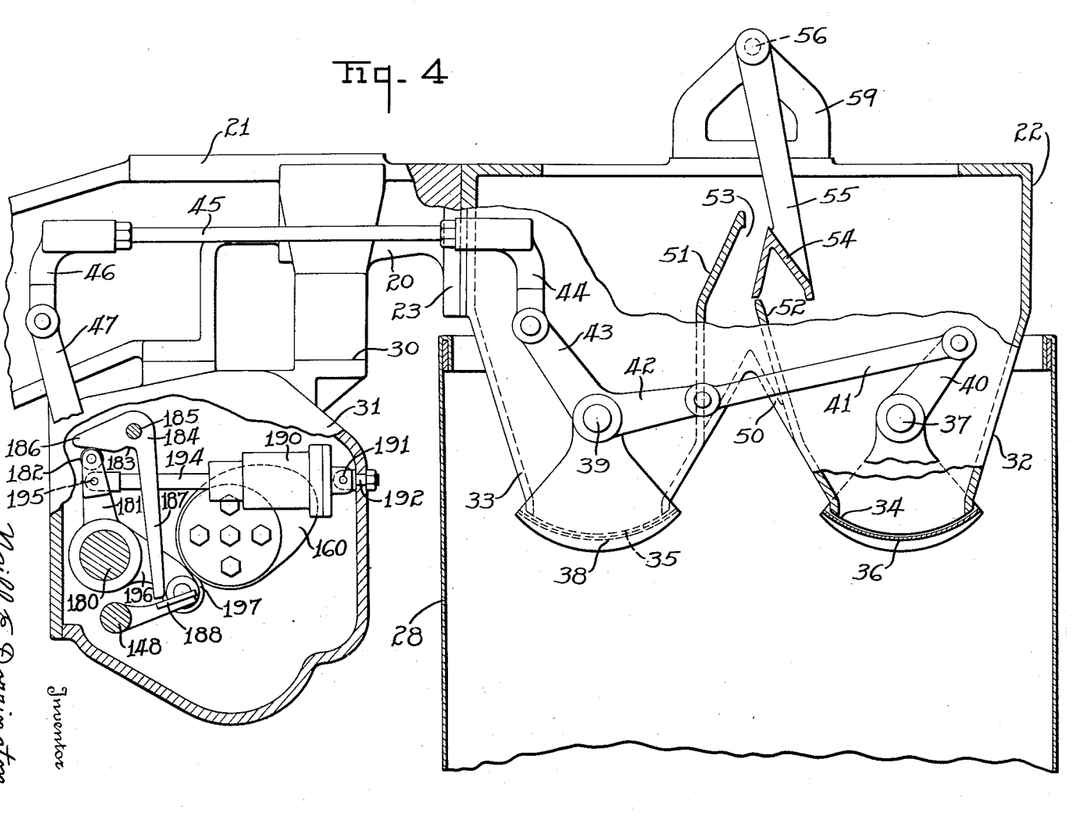
Figure 4 is a partial vertical longitudinal section showing in particular the operation of the interrupting gates for accumulating the main charge.

The mechanism having been described in detail, the operation of the device will be briefly summarized. Assuming that the parts are in the position in which they are shown in Figure 7, and a stream, not indicated on the drawings, is being discharged into hopper 22, gates 36 and 38 will be open and deflector gate 54 will be swung to the right as shown in the drawings. Accordingly the stream, which is preferably directed into the middle of hopper 22, is divided into three portions, the side portions going through the sides of hopper 22 through openings 34 and 35 into weighing can 28, while the central portion of the stream flows downward between deflecting member 54 and the top of partition 51 through passage 53 and so on down into weighing can 28. This operation continues until the greater portion of the required charge has been fed into can 28 whereupon weight 29 is overbalanced, and the forward ends of the scale beams move downward until auxiliary bar 93 rests upon stop 98. This relieves the can from weight 94 and therefore the beam is halted for a time in this position, but the movement of the scale beam to this position is sufficient to raise link 146 and depress arm 149 and plate 188 sufficiently to release latch finger 187 whereupon arm 47 swings from the position in which it is shown in Figure 7 to that in which it is shown in Figures 4 and 5, gates 36 and 38 closing in this manner, as described in connection with the detailed showing. It may be added that the proportion of the parts constituting the connections of the gates is such that one of the gates moves slightly ahead of the other gate so that their movement is not exactly simultaneous and being slowed up by dash pot 190, there is no abrupt or sudden change in the amount of material being deposited in the weighing can, but the reduction of the stream is gradual.

It will be readily seen that after these gates are closed the material constituting the sides of the feeding stream is caught by these gates and accumulates in the two sides of hopper 22, while only the portion entering passage 53 continues into the weighing can. This comparatively small dribble feed continues until it has made up the balance of the required charge whereupon the forward ends of the scale beams again descend, raising link 146 and depressing latch plate 188 sufficiently to free the end of latch finger 201. Thereupon shaft 155 and cams 158 and 160 begin to turn. As the cams and shaft 159 turn, cam 175 is moved so that its concentric portion encounters finger 173 and holds stop finger 168 out of the path of clutch finger 167 until a complete revolution of the cams has been made, whereupon finger 173 drops into recess 174 in cam 175, allowing finger 168 to return to its stopping position. In this way one revolution, and one only, of the controlling cams is made.

As soon as cam 158 starts to move in the direction of the arrow shown in Figure 7, arm 211 drops into recess 212 allowing spring 125 to urge rod 122 to the right, as shown in Figure 3, swinging rock shaft 127 and arm 131 as will be readily understood. When rod 122 is moved in this manner lug 123 encounters lug 124 on arm 114 and swings pivot 115 to the right of a position over pivot 113. Thereupon the weight of the material upon gates 100 and 101 counterbalances weight 118 and swings the gates open, dumping the material in the can. When the gates are swung in this manner their extended ends 104 encounter bumpers 105 and hold the gates in the dotted line position in which they are shown in Figure 3. Immediately after the material is discharged from can 28 in this manner, the concentric portion 164 of cam 158 encounters arm 211 forcing it back to the position in which it is shown in Figure 7 and thereby drawing rod 122 back to the position in which it is shown in Figure 3. The weighted extensions 104 of the gates and weight 118 on arm 116 close the gates when lug 123 encounters lug 119 and starts arm 116 to the left.

As the cams continue to turn, the rise or lobe 163 of cam 160 encounters roller 197 and rocks shaft 180 back to the position in which it is shown in Figure 7. As a matter of fact the lobe extends slightly farther than is necessary to force the rock shaft to this position and the resulting over-travel moves arm 181 and roller 182 far enough to force fingers 187 and 201 well beyond the path of latch plate 188. The elongated slot 150 allows plate 188 to be depressed during the movement thereover of latch fingers 187 and 201, even though the scale beam has returned to its original position before this action takes place. This swinging movement of rock shaft 180 returns arm 47 to the gate opening position shown in Figure 7. During this movement the gates likewise move slightly in succession, that is one gate starting to open slightly before the other gate so that the material is not dropped suddenly into the can, but is poured downward in a gradually increasing stream. The slight over-travel of rock shaft 180, as discussed above, makes certain that the gates are both swung to fully open position so that the accumulated material in hopper 22 is fully discharged into the weighing can. Thereafter the slight return of the gates will do no damage as the openings are left amply large for the discharge of the material as fast as it is fed in by the main feeding stream.

This same movement of rock shaft 180, through the contact of roller 182 with latch member 200, moves that latch member against roller 203 and rocks shaft 65 and arm 64 so as to swing deflecting gate 54 back to its open position, as shown in Figure 4. It also raises cam 207 out of the way of lug 208 so that when the rotation of cam 175 allows finger 173 to drop into recess 174, lug 208 has been freed and stop finger 168 is immediately moved by spring 171 into stopping position. Thereafter the cycle of operation is repeated.

The above description has assumed the continued automatic operation of the device. Under some circumstances it is desirable to make the exact time of dumping the charge dependent upon the readiness for the charge of a packaging device or other receiver.

To provide for such a situation, the apparatus is constructed so that the charge may be called at the will of an operator instead of the discharge following automatically upon the swinging of the scale beam.

This is effected by loosening bolt and slot connection 206, swinging member 207 upward so that it will not contact lug 208 when roller 203 drops to its lowest position and fastening member 207 in that raised position. Thereafter the downward movement of the weighing can is not followed automatically by the closing of clutch 165—166, but the clutch can be closed and the charge called, at any time after it is completed, by operating arm 179 to actuated lug 177 and through it release stop finger 168 from the clutch-closing finger 167.

Figure 15:
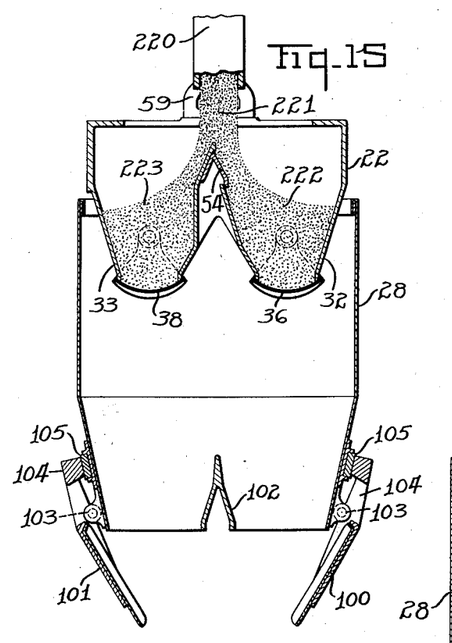
Figures 15, 16 and 17 are somewhat diagrammatic views showing the method of dividing the stream into charges.
Figure 16:
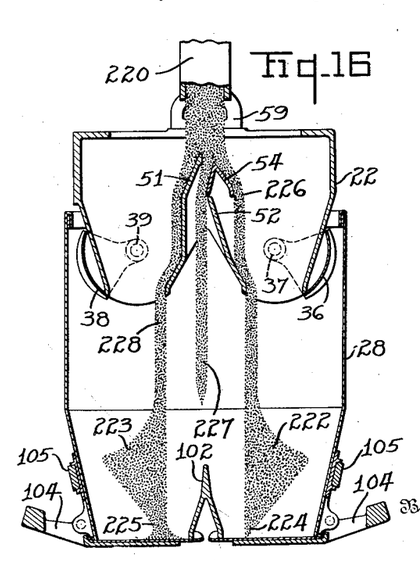
Figure 17:
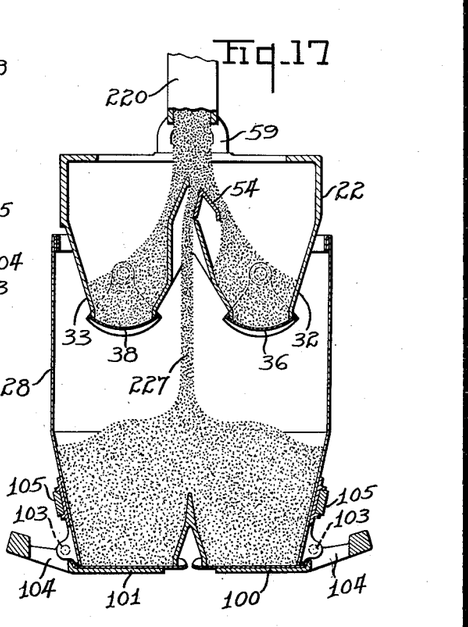

In Figs. 15, 16 and 17 there is shown diagrammatically successive steps in the operation of dividing the stream into charges.

In these views there is shown a discharge spout 220 from which a continuous substantially uniform stream 221 may be discharged in any suitable manner.

When gates 36 and 38 and deflector 54 are in their closed positions, as shown in Fig. 15, during the dumping of the previous charge, the stream is divided at the upper end of partition 51 and is accumulated as masses 222 and 223 above gates 36 and 38 respectively.

After gates 100 and 101 have closed, gates 36 and 38 and deflector 54 are swung to their open positions, as shown in Fig. 16. Thereupon masses 222 and 223 are dropped upon gates 100 and 101, the bottoms of the masses being pointed by the gradual opening of the gates, so that the descending masses are pointed at the bottoms, as shown at 224 and 225. It will be readily understood that when arm 42 moves downward the breaking of the toggle formed by it and link 41 moves arm 40 only slowly on the start, so that gate 38 opens ahead of gate 36 and mass 223 reaches the bottom of the weighing can slightly ahead of mass 222.

While gates 36 and 38 and deflector 54 are in their open positions, stream 221 is divided into three parts, sub-stream 226 flowing to the right of deflector 54 as viewed in Fig. 16, sub-stream 227 flowing through opening 53, and sub-stream 228 flowing to the left of partition 51. These three sub-streams, constituting the entire flow of stream 221, continue into the weighing can until the can is depressed thereby and releases latch 187.

When latch 187 is tripped, gates 36 and 38 are closed, and streams 226 and 228 start accumulating thereabove, while stream 227 continues, as shown in Fig. 17, until the full charge is received in the weighing can, whereupon latch 201 is tripped and deflector 54 is moved to deflect stream portion 227 into the accumulating mass above gate 36.

Normally the charge is dumped and gates 36 and 38 reopened before the material accumulated in the hopper 22 interferes with the free flow of material from spout 220, so that stream 221 may be maintained both continuous and substantially uniform. If the flow from spout 220 is by gravity, any unusual or accidental discontinuance of the operation of the weighing device automatically stops the flow of stream 221 by the accumulation of material in hopper 22. If stream 221 is forcibly fed, some arrangement may be made for stopping the force feed when necessary, no such stoppage being necessary during the normal operation of the apparatus.

It will be seen from the above that a continuous substantially uniform stream can be fed into hopper 22 and that stream is divided continuously into successive weighed charges, each charge being formed first by the dropping of the accumulated material above gates 36 and 38 and then by the full amount of the feeding stream until the main charge has been received. Thereupon the major portion of the feeding stream is interrupted by gates 36 and 38 and accumulated while the central portion of the stream passing through passage 53 completes the weighed charge. This completion is sufficiently rapid, and the discharge of the weighing can is so prompt after the completion of the charge, that after the closing of the gates 36 and 38 the charge is completed and emptied and discharge gates 100 and 101 are again closed before hopper 22 is filled and preferably the completion of the charge by dribble feed and the emptying of the weighing can occupies only a minor portion of the time so that there is no danger of the accumulated material on gates 36 and 38 dropping with sufficient force to have its momentum move the scale beams.

The above arrangement is both accurate and rapid and is particularly advantageous as it makes possible the feeding of the material in an uninterrupted and substantially uniform stream. When the feeding stream is stopped and started there are delays as well as difficulties introduced in the handling of the material so that this possibility of feeding the material to the weighing device in a continuous substantially uniform stream is a material improvement over any method by which intermittent streams are fed.

It will be further noted that the controlling mechanism for the gates of the feed hopper 22 as well as the discharge gates of the weighing can does not place any obstruction in the way of the free undisturbed movement of the weighing beams. The timing of the operation is controlled by the trip actuated by the scale beam through link 146, but power is supplied from any desired source to actually effect the movements of the gates so that the friction upon the scale beam by its control operation is reduced to a minimum.

It will be readily understood that the details of the operating mechanism can be varied in many ways without departing from the main features of the invention and that the details are shown by way of illustration only except as hereinafter specified in the claims.

What I claim is:—

1. The method of segregating weighed charges of material which consists in forming a continuously flowing substantially uniform stream of the material and controlling the flow into a weighing receptacle to feed the main portion of a desired charge into the receptacle rapidly and then completing the exact amount of the desired charge slowly, discharging the weighed charge from the receptacle and repeating.

2. The method which consists in forming a continuously flowing, substantially uniform stream of material, feeding the material into a weighing receptacle until the major portion of a desired charge is received in the receptacle, then intercepting and accumulating a portion of the stream and continuing to feed into the receptacle the remaining portion of the stream until the exact amount of the desired charge is completed, then intercepting said remaining portion of the stream and discharging the weighed charge from the receptacle, then feeding into the receptacle the material accumulating during said interceptions, then feeding into the receptacle the full stream until the major portion of a desired charge is received in the receptacle, then intercepting and accumulating a portion of the stream while continuing to feed into the receptacle the remaining portion of the stream, and repeating the steps described in succession and thereby dividing the continuous stream into a succession of weighed charges.

3. The method which consists in forming a continuously flowing substantially uniform stream of material and dividing the stream into a succession of weighed charges by feeding material from the stream into a weighing receptacle rapidly until the major portion of a charge is received in the receptacle and then feeding material from the stream slowly into the receptacle to complete the exact amount of the charge, discharging the receptacle and repeating.

4. The method which consists in forming a continuously flowing and substantially uniform stream of material, intermittently intercepting and accumulating portions of the stream and allowing said accumulated portions to proceed with the stream, and forming weighed charges by first filling intercepted portions of the stream into a weighing receptacle to place therein a portion of a charge rapidly, and finally bringing the amount in the receptacle to the exact predetermined weight by a portion only of the stream while intercepting a portion of the stream to accumulate material for the successive charge.

5. Weighing apparatus including means providing a constantly flowing stream of material, a weighing receptacle, stream regulating and accumulating means interposed between the stream providing means and the receptacle, controlling means for the regulating means and the receptacle, said controlling means stopping the flow of material from said regulating means to said receptacle when the receptacle has received a predetermined amount, dumping the receptacle and returning the receptacle to receiving position and reopening flow from the regulating means, the operation of the control means being timed with respect to the capacity of the regulating means and the size of said stream so that the regulator has storage room for more material than flows from the stream providing means during the interval flow from the regulating means is stopped, whereby the material is weighed out and dumped in successive weighed charges without interrupting or varying the continuous flow from said providing means.

6. In combination, means for providing a constant stream of material, a weighing receptacle, stream regulating and accumulating means between the stream providing means and the receptacle and comprising an accumulating hopper and discharge gates, and control means for the receptacle and the regulating means, said control means closing said gates and dumping the receptacle when a predetermined weight has accumulated in the receptacle, and thereafter returning the empty receptacle to receiving position and opening said gates, the gates and receptacle having capacities for discharging material larger than the capacity of the stream providing means, and the parts being related so that successive charges are weighed and dumped without interrupting or slowing up said constant stream.

7. Weighing apparatus comprising a weighing device provided with a receptacle, means to provide a stream of material above the receptacle, a stream-controlling hopper comprising means to divide the stream into stream portions and independent means to intercept different stream portions, and means controlling the intercepting means and operating them to remove them from intercepting position when the receptacle is empty and to move them into intercepting position successively as the receptacle fills, said controlling means including a plurality of latches tripped by movement of the weighing receptacle to successively lower positions, the weighing device including counterbalancing means providing increased counterbalance for the receptacle as it moves downward, and said controlling means comprising means to time the operation of the successive intercepting means in accordance with successive positions of the receptacle, said stream-forming means having a constantly open discharge mouth above the receptacle.

8. Weighing apparatus comprising a source for a constant substantially uniform stream of material, a hopper in the path of said stream, a partition in the hopper normally dividing the stream into portions, a gate movable across the outlet of one stream portion, a deflector movable into and out of the path of a second stream portion and, when in said path, deflecting said second stream portion onto said gate, means to first close the gate and then move the deflector into operative position, means to open the gate and move the deflector to inoperative position, a weighing receptacle, and means controlled by the movements of the receptacle and operating the gate and deflector.

9. Weighing apparatus comprising a source for a constant substantially uniform stream of material, a hopper in the path of said stream, a partition in the hopper normally dividing the stream into portions, a gate movable across the outlet of one stream portion, a deflector movable into and out of the path of a second stream portion and, when in said path, deflecting said second stream portion onto said gate, means to first close the gate and then move the deflector into operative position, means to open the gate and move the deflector into inoperative position, a weighing receptacle, a power operated device, and means controlled by the movement of said receptacle and timing the actuation of said gate and deflector from said power device.

10. Weighing apparatus comprising a source for a constant substantially uniform stream of material, a hopper in the path of said stream, a partition in the hopper normally dividing the stream into portions, a gate movable across the outlet of one stream portion, a deflector movable into and out of the path of a second stream portion and, when in said path, deflecting said second stream portion onto said gate, means to first close the gate and then move the deflector into operative position, means to open the gate and move the deflector into inoperative position, a weighing receptacle, a discharge gate for the receptacle, power means, and means controlled by the position of the receptacle and timing the operation from the power device of the said gates and deflector.

11. A weighing device comprising a power driven shaft, a series of cams, a self-opening clutch connecting the shaft and cams, a weighing receptacle, means supporting the receptacle and yielding in response to the weight of material in the receptacle, a plurality of devices actuated by said cams and governing the admittance of material to the receptacle and the discharge therefrom, manually operable means for closing the clutch, and means controlled by the downward movement of the receptacle for closing the clutch, the last said means including a member adjustable to make said means effective or ineffective, as desired.

12. A weighing device comprising a scale beam, a receptacle supported on the beam, a main counterbalance, auxiliary means increasing the effective counterbalance at an intermediate position of the receptacle, a source of a substantially constant stream of material over the receptacle, a hopper in the path of the stream, a partition in the hopper dividing the stream into stream portions, a gate movable into position at the bottom of the hopper across the outlet of one stream portion, a deflector movable into and out of the path of a second stream portion, means normally urging the gate to closed position, means normally urging the deflector to deflecting position, a latch normally holding the gate in open position, a latch normally holding the deflector in inoperative position, a tripping means releasing the gate latch when the receptacle is partly depressed and releasing the deflector latch when the receptacle is fully depressed, a dumping gate for the receptacle, and power operated means controlling the dumping gate and returning the hopper gate and deflector to latched positions.

13. Weighing apparatus comprising a source of supply for a stream of material, a stream controlling device and a weighing hopper, said stream controlling device comprising a hopper having a plurality of discharge openings, one of said openings being located at a lower point than another of said openings and having a pocket thereabove, a gate for the lower opening and a combined gate and deflector for the upper opening, said gate and deflector deflecting material into said pocket when it is in position to close the upper of said openings.

14. Weighing apparatus comprising means to supply a stream of material, a weighing receptacle and a stream controlling device above the receptacle, said device comprising a hopper providing two pockets with a channel therebetween, a gate for the bottom of each pocket and a combined gate and deflector for the top of said channel, said gate and deflector deflecting the material into one of said pockets when in channel-closing position.

15. Weighing apparatus comprising a weighing receptacle and discharge means above the receptacle, said discharge means being provided with a plurality of discharge openings, gates for said openings, a single trip actuated by the weighing means, and connections rendered operable by said trip and closing two of said gates, one of them slightly in advance of the other.

16. Weighing apparatus comprising a weighing receptacle, discharge means above the receptacle and comprising a plurality of discharge gates, control means operated by a predetermined weight of material in the receptacle for closing the gates, and connections between the control means and the gates moving the gates simultaneously over the greater part of their closing movement, but closing one gate slightly before the other.

17. Weighing apparatus comprising a weighing receptacle, discharge means above the receptacle and comprising a plurality of discharge gates, control means for the gates operated to close them by a predetermined weight of material in the receptacle and to open them after the dumping of the receptacle, and connections between the control means and the gates moving one of the gates slightly in advance of the other on both opening and closing movements while moving them simultaneously during the greater part of each closing and opening movement.

NEILL E. DORRINGTON.